Figure 1:
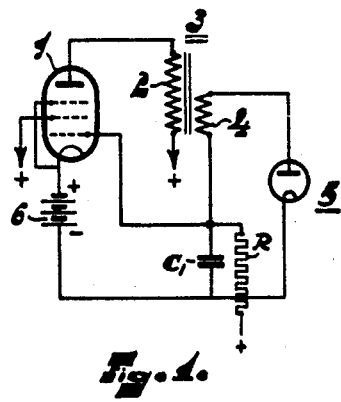

June 19, 1951     J. J. P. VALETON ET AL     2,557,209
CIRCUIT-ARRANGEMENT FOR GENERATING DIRECT VOLTAGES Filed July 28, 1949

INVENTORS
JOSUE J. P. VALETON
BERNARDUS W. V. I. SCHENAU

BY

AGENT

Patented June 19, 1951

2,557,209

UNITED STATES PATENT OFFICE 2,557,209

CIRCUIT ARRANGEMENT FOR GENERATING DIRECT VOLTAGES

Josué Jean Philippe Valeton and Bernardus Willem van Ingen Schenau, Eindhoven, Netherlands, assignors to Hartford National Bank and Trust Company, Hartford, Conn., as trustee Application July 28, 1949, Serial No. 107,284
In the Netherlands August 5, 1948

2 Claims. (Cl. 321—2)

This invention relates to circuit-arrangements for generating direct voltages. It is sometimes desirable to provide a source of high direct voltage which is loaded by a low current only. This is especially so in supplying electron-beam tubes, for example television tubes, wherein anode voltages of several tens of kilovolts are used, and the current consumed is of the order of 100 microamperes only.

As is known, such high direct voltages are obtainable by utilising the voltage pulses produced by way of an inductance with which a capacity is connected in parallel, if a current is produced and interrupted periodically therein. By rectification of these voltage pulses, a high direct voltage is obtained.

For example, the inductance may be inserted in the output circuit of a discharge tube, which discharge tube is cut-off periodically. The tube may be cut off by means of a separately produced voltage which is supplied to the control grid of the discharge tube, or the discharge tube may be inserted in a generator circuit-arrangement, in which cutting-off voltages are generated periodically at the control grid of the tube.

The invention relates to a circuit-arrangement of the last-mentioned type which comprises a condenser ($C_1$) which is connected between the control grid and the cathode lead of the tube which condenser is charged periodically by way of an impedance and subsequently discharged by way of a rectifier and an inductance connected in series, the inductance being inductively coupled with the output circuit of the discharge tube such that the rectifier is cut-off during the charging of the condenser.

In such a known circuit-arrangement for generating relaxation oscillations, the direct voltage is obtained by rectifying the voltage pulses which are produced by way of an inductance, coupled with the output circuit of the discharge tube, and a capacity connected in parallel with the inductance.

In such a circuit-arrangement it appears, however, that the direct voltage obtained varies with the load, due to the internal resistance of the arrangement.

Such a load-dependent direct voltage is undesirable for many purposes, more particularly for the supply of television tubes and the circuit-arrangement according to the invention has for its object to mitigate these difficulties by reducing said internal resistance.

The circuit-arrangement according to the invention is characterized in that a condenser ($C_2$) shunted by a resistance ($R_2$) is connected between the control grid and the impedance and both a control voltage of negative polarity, which is dependent upon the load of the source of direct voltage, and a fixed positive bias are supplied, by way of resistances $R_1$ and $R_3$ respectively, to the control grid, the said resistances and condensers are so chosen that $$\frac{C_2}{C_1+C_2}$$

is smaller than $$\frac{R_1 R_3}{R_1 R_2 + R_2 R_3 + R_3 R_1}$$

Figure 2:
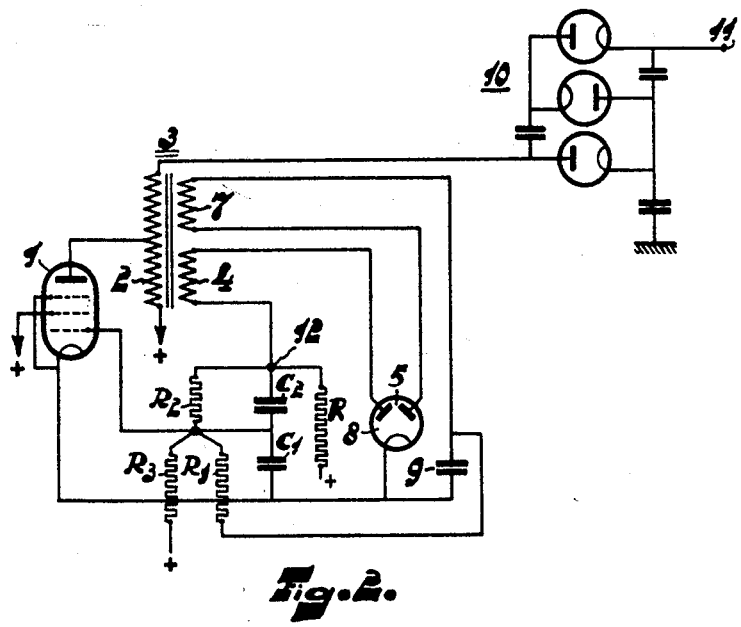

In order that the invention may be more clearly understood and readily carried into effect, it will now be described more fully with reference to the accompanying drawing, given by way of example, in which Fig. 1 represents diagrammatically a known circuit-arrangement for producing relaxation oscillations, and Fig. 2 represents diagrammatically one embodiment of the circuit-arrangement according to the invention.

Referring now to Fig. 1, the control-grid circuit of a discharge tube 1 comprises a condenser $C_1$ adapted to be charged, by way of a resistance R, from a source of direct voltage (not shown).

The output circuit of tube 1 comprises an inductance 2 which is constructed as a primary winding of a transformer 3. One end of the secondary winding 4 of the transformer 3 is connected to the control grid of tube 1 and the other end to the anode of a diode 5, of which the cathode is connected to the electrode of condenser $C_1$, remote from the control grid of the tube 1.

If, initially, the tube 1 is not passing current, the condenser $C_1$ will be charged by way of the resistance R, due to which the potential at the control grid of tube 1 increases and current tends to flow in the tube, of which current the strength increases substantially linearly. In this manner, a substantially constant rate of voltage drop occurs across the winding 2 of transformer 3.

Across the secondary winding 4 a constant voltage of such polarity is set up that the diode 5 remains non-conductive.

If the voltage across condenser $C_1$ increases such that it exceeds the voltage appearing across winding 4, the control grid voltage cannot increase further, since the diode becomes conductive, so that condenser $C_1$ becomes discharged. The tube 1 is cut off and the oscillations produced in inductance 2, together with the natural- and wiring-capacity connected in parallel therewith, tend to become damped out. Due to the voltage appearing across winding 4, the condenser $C_1$ is rapidly charged in the reverse direction by way of the diode 5, with the result that the control grid potential of tube 1 becomes highly negative. Subsequently, the grid voltage becomes slowly more positive due to the charging of condenser $C_1$ and the cycle is repeated.

The cathode lead of tube 1 comprises a battery 6 which serves for the exact setting of the tube.

The amplitude of the sawtooth voltage appearing by way of condenser $C_1$ is preferably chosen to be great with respect to the grid base of tube 1, and the average grid voltage may be chosen below the cut-off point of the tube. As a result thereof there is sufficient time for the damping out of the oscillations generated in the inductance 2 in the output circuit of tube 1.

With given values of the resistance R and the capacity of the condenser $C_1$ the scope of the sawtooth voltage is determined. Moreover, with a given tube and transformer, the voltage drop by way of winding 4 and consequently the voltage at which the diode 5 becomes conductive are likewise determined. This occurs at a definite value of the control grid voltage and the current of the tube.

Consequently, the amount of energy produced per cycle in inductance 2 is constant. Only the frequency is variable. A given load of the rectifying arrangement to be provided across inductance 2, i. e. a given damping during the occurrence of the first peaks or the natural oscillation across inductance 2, is associated with a given sawtooth amplitude, and since the upper level of this amplitude is given, with a given frequency. With an increase in load, the sawtooth amplitude decreases and consequently the frequency and the power absorbed increase. However, the direct voltage obtained will decrease, due to the internal resistance of the arrangement.

To reduce the internal resistance, use may be made of a load-dependent control voltage.

However, in a circuit arrangement of the type shown in Fig. 1, the use of such a control voltage entails several difficulties.

Fundamentally it is possible to make the control voltage operative in the cathode load of the diode 5. To this end, however, this voltage must then be generated by way of a low resistance, which involves difficulties of a practical nature.

If, alternatively, the sawtooth voltage in the control grid circuit were supplied to the control grid by way of a condenser, and this grid were brought, by way of a high resistance, to a direct voltage level influenced by the control voltage, no stable oscillation would be possible.

With the use of a circuit-arrangement according to the invention as shown in Fig. 2, it has been found possible to influence the average control-grid voltage by means of a control voltage, whilst retaining stable oscillation.

In Fig. 2 circuit elements corresponding to those shown in Fig. 1 are denoted by the same references.

The primary winding 2 of transformer 3 is fed from the anode of tube 1 at an intermediate point in this circuit-arrangement, which permits the admission of a great voltage pulse by way of inductance 2, without the anode voltage of tube 1 becoming unduly high.

By means of a voltage multiplying arrangement 10, the voltage pulses appearing by way of inductance 2 are rectified in a known manner and the direct voltage may be taken from the terminal 11.

A control voltage appearing by way of condenser 9 is taken from a secondary winding 7 of transformer 3 by way of a diode 8 which is united with the diode 5, to form a double diode in a single envelope.

The winding 7 is preferably chosen to be such as to bring about rectification of the first negative voltage peak produced upon oscillations being produced in inductance 2, since this peak value varies to a greater degree than the first positive voltage peak with the load of the source of direct voltage.

Between the control grid and the cathode lead, a condenser $C_1$ is again connected, and a condenser $C_2$ shunted by a resistance $R_2$ is connected between the control grid of tube 1 and the resistance R.

Owing to this, only a fraction $$\frac{C_2}{C_1+C_2}$$

of the sawtooth voltage set up at point 12 is supplied to the control grid of tube 1.

The control voltage is taken from the condenser 9 and supplied, with negative polarity, to the control grid by way of a resistance $R_1$.

In order to secure the desired control grid bias, a positive voltage is supplied to the control grid by way of resistance $R_3$.

If the average voltage set up at point 12 is represented by $V_1$, the control voltage by $V_2$ and the bias set up at resistance $R_3$ by $V_3$, the average control-grid voltage is equal to $$\frac{V_1 R_1 R_3 + V_2 R_2 R_3 + V_3 R_1 R_2}{R_1 R_2 + R_2 R_3 + R_3 R_1}$$

The variations of the control voltage $V_2$ appear maximally in a ratio $$\frac{R_2 R_3}{R_1 R_2 + R_2 R_3 + R_3 R_1}$$

at the control grid.

In order to obtain the stable oscillations, the condition should be satisfied that $$\frac{C_2}{C_1+C_2} < \frac{R_1 R_3}{R_1 R_2 + R_2 R_3 + R_3 R_1}$$

The frequency is determined by the value of the resistance R the capacity $$\frac{C_1 C_2}{C_1+C_2}$$

and the voltage set up across resistance R.

What we claim is:

1. An electrical circuit arrangement for producing a direct voltage for supplying a variable impedance load, comprising an electron discharge tube having cathode, control grid and anode electrodes, a first capacitive element intercoupling said control grid and cathode electrodes, an inductive element coupled to said anode electrode, means comprising an impedance element to produce charge variations of said first capacitive element to cause said discharge tube to conduct thereby to produce current flow through said inductive element, means coupled to said first capacitive element and to said inductive element and comprising a first rectifier element to discharge said first capacitive element thereby periodically to suppress current flow through said first inductive element and to produce oscillations across said first inductive element, said coupling means periodically rendering said first rectifier element non-conductive thereby to permit charging of said first capacitive element, a second capacitive element intercoupling said control grid electrode and said impedance element, means to derive a control voltage proportional to the impedance value of said variable impedance load, means comprising a first resistive element to apply said control voltage to said control grid electrode in a negative polarity, a second resistive element coupled in parallel with said second capacitive element, means comprising a third resistive element to apply a positive bias potential to said control grid electrode, said first and second capacitive elements and said first, second and third resistive elements having values at which $$\frac{C_2}{C_1+C_2}$$

is smaller than $$\frac{R_1 R_3}{R_1 R_2 + R_2 R_3 + R_3 R_1}$$

where $C_1$, $C_2$, $R_1$, $R_2$ and $R_3$ represent the values of said first and second capacitive elements and said first, second and third resistive elements respectively, and a second rectifier element coupled to said inductive element for energizing said variable impedance load.

2. An electrical circuit arrangement for producing a direct voltage for supplying a variable impedance load, comprising an electron discharge tube having cathode, control grid and anode electrodes, a first capacitive element intercoupling said control grid and cathode electrodes, a first inductive element coupled to said anode electrode, means comprising an impedance element to produce charge variations of said first capacitive element to cause said discharge tube to conduct thereby to produce current flow through said first inductive element, means coupled to said first capacitive element and comprising a series combination of a second inductive element and a first rectifier element to discharge said first capacitive element thereby periodically to suppress current flow through said first inductive element and to produce oscillations across said first inductive element, said second inductive element being inductively coupled to said first inductive element periodically to render said first rectifier element non-conductive thereby to permit charging of said first capacitive element, a second capacitive element intercoupling said control grid electrode and said impedance element, means to derive a control voltage proportional to the impedance value of said variable impedance load, means comprising a first resistive element to apply said control voltage to said control grid electrode in a negative polarity, a second resistive element coupled in parallel with said second capacitive element, means comprising a third resistive element to apply a positive bias potential to said control grid electrode, said first and second capacitive elements and said first, second and third resistive elements having values at which $$\frac{C_2}{C_1+C_2}$$

is smaller than $$\frac{R_1 R_3}{R_1 R_2 + R_2 R_3 + R_3 R_1}$$

where $C_1$, $C_2$, $R_1$, $R_2$ and $R_3$ represent the values of said first and second capacitive elements and said first, second and third resistive elements respectively, and a second rectifier element coupled to said first inductive element for energizing said variable impedance load.

JOSUÉ JEAN PHILIPPE VALETON.
BERNARDUS WILLEM
    van INGEN SCHENAU.

No references cited.